United States Patent [19]

Best

[11] Patent Number: 5,393,072

[45] Date of Patent: * Feb. 28, 1995

[54] TALKING VIDEO GAMES WITH VOCAL CONFLICT

[76] Inventor: Robert M. Best, 777 108th Ave. NE., Suite 2460, Bellevue, Wash. 98004

[*] Notice: The portion of the term of this patent subsequent to Oct. 25, 2011 has been disclaimed.

[21] Appl. No.: 63,858

[22] Filed: May 19, 1993

Related U.S. Application Data

[63] Continuation-in-part of Ser. No. 614,843, Nov. 14, 1990, and a continuation-in-part of Ser. No. 864,845, Apr. 7, 1992, abandoned.

[51] Int. Cl.$^6$ .............................................. A63F 9/22
[52] U.S. Cl. .................................................... 273/434
[58] Field of Search ............... 273/434, 435, 437, 438, 273/DIG. 28, 85 G

[56] References Cited

U.S. PATENT DOCUMENTS

| | | |
|---|---|---|
| 4,305,131 | 12/1981 | Best . |
| 4,333,152 | 6/1982 | Best .................................... 364/521 |
| 4,445,187 | 4/1984 | Best .................................... 364/521 |
| 4,569,026 | 2/1986 | Best .................................... 364/521 |
| 4,846,693 | 7/1989 | Baer . |
| 4,884,972 | 12/1989 | Gasper . |

FOREIGN PATENT DOCUMENTS 0016314 10/1980 European Pat. Off. .
0299831 1/1989 European Pat. Off. .

OTHER PUBLICATIONS

Best: Movies That Talk Back, IEEE Transactions on Consumer Electronics, vol. CE-26, Aug. 1980.
Lombardi: Spellcasting 101, Computer Gaming World, No. 76, Nov. 1990 issue, pp. 20, 22, 94.
Talking Back to the Tube, Newsweek issue of Dec. 3, 1990 pp. 56, 57.

*Primary Examiner*—Jessica J. Harrison
*Attorney, Agent, or Firm*—Graybeal Jackson Haley & Johnson

[57] ABSTRACT

Talking video games provide simulated voice dialog between human players and animated characters on a video or television screen. Two or more animated characters argue with each other and with human game players who control directly or indirectly what the characters do and say. Many different kinds of vocal conflicts can be simulated. Each scene branches to two or more subsequent scenes. But within each scene there are several branching dialog sequences, thereby providing a large variety of possible dialogs. Pictures and voices are generated from digital data read from a laser-readable disk or stored in semiconductor memory. Each player has a hand-held controller that displays two or more phrases or sentences. A player responds to what an animated character says by pressing a button next to a selected sentence. An animated character then responds vocally or by action to the selected sentence as if it had been spoken by the human player or says the words the player selected. Speech recognition is not required. Human players are thus given an illusion of having voice dialog with interesting characters involved in vocal conflicts.

7 Claims, 12 Drawing Sheets

FIG. 9
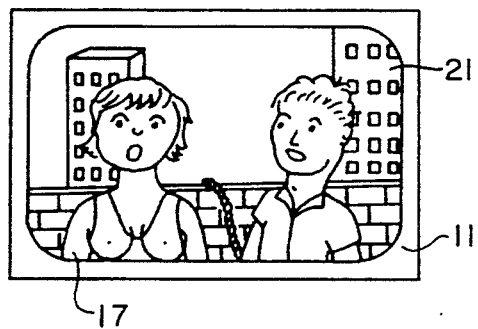
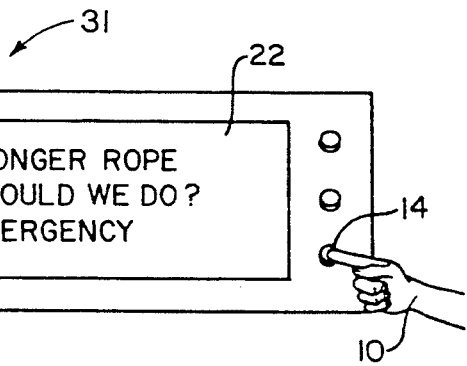
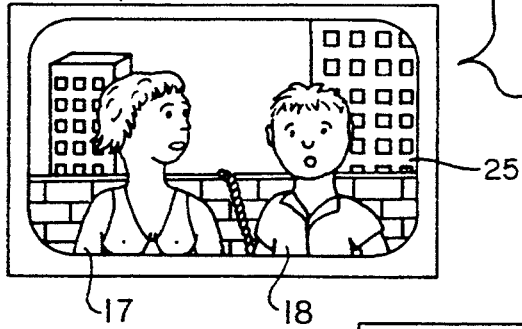
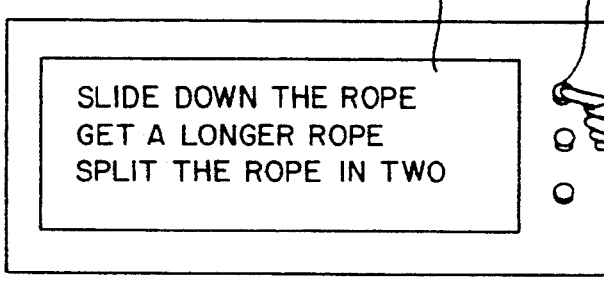
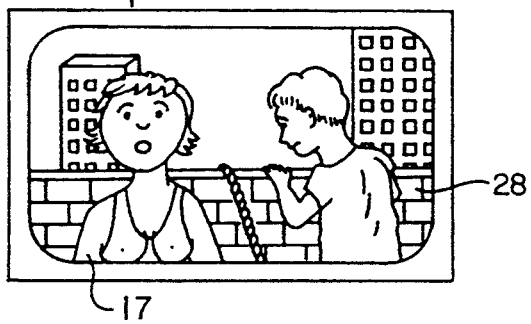

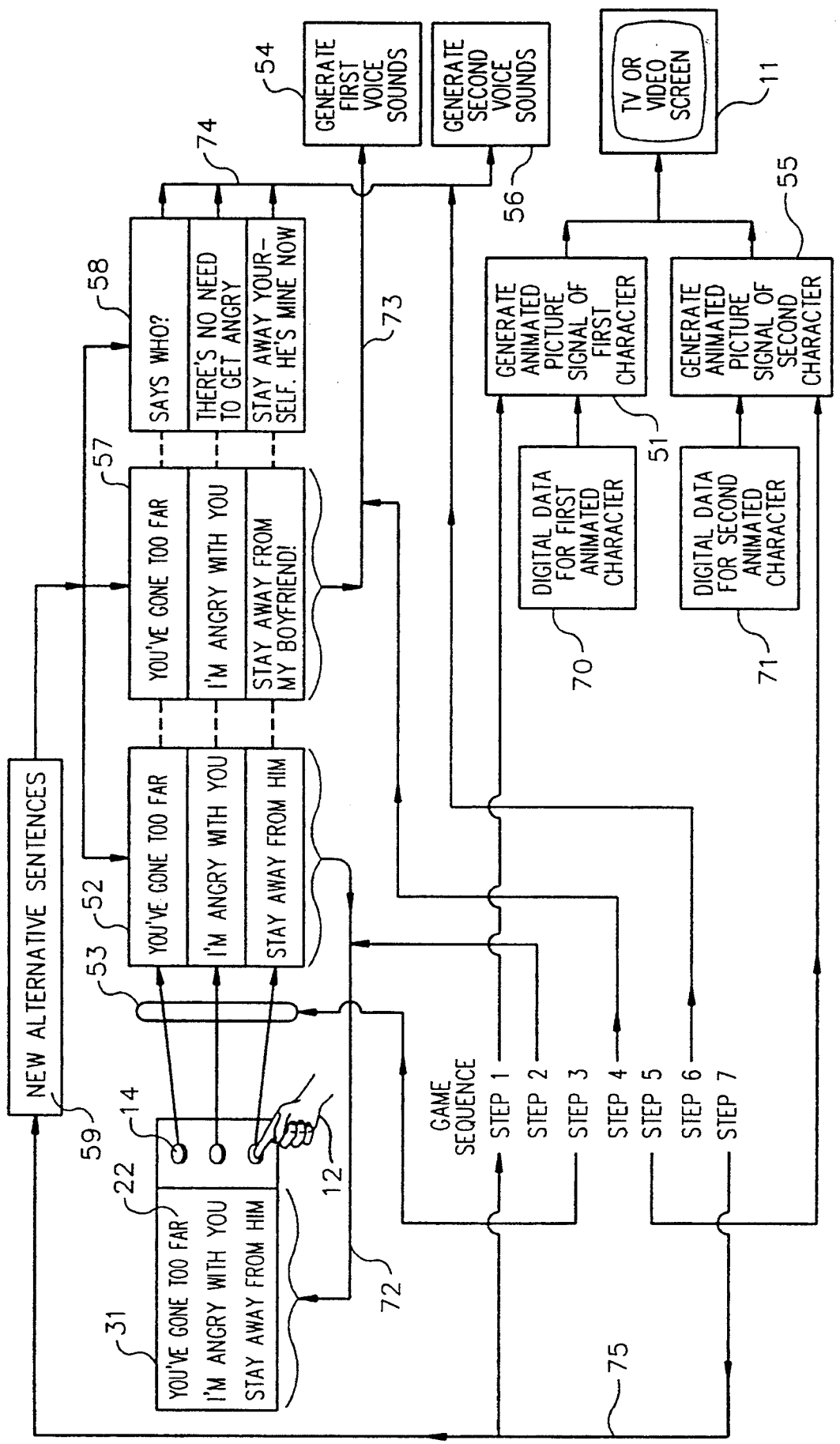

TALKING VIDEO GAMES WITH VOCAL CONFLICT

This is a continuation-in-part of U.S. patent application Ser. No. 07/614,843, filed Nov. 14, 1990, abandoned in favor of application Ser. No. 08/140,266, filed Oct. 21, 1993, pending and a continuation-in-part of U.S. patent application Ser. No. 07/864,845, filed Apr. 7, 1992, abandoned.

TECHNICAL FIELD OF THE INVENTION

This invention relates to video games, animated cartoons, and picture/sound synchronization.

BACKGROUND OF THE INVENTION

Human conflict is the force that moves drama. Drama in motion picture film, television and stage is based on conflicts between the characters and the problems they encounter. The dialog that emerges from these conflicts is what makes the drama captivating and entertaining. The kinds of dialog that expose or resolve human conflicts can be used in talking video games.

Human players have long been able to control what characters do and what actions they perform in prior-art video games. But adding voice sounds and talking animated picture sequences to prior-art video games is not enough to simulate a face to face voice conversation. Talking video games such as Wanderers From Ys have animated cartoon sequences that alternate with side-scrolling skill-and-action sequences in which some of the characters talk. Although the actions of some of the characters can be controlled by a human player, characters do not yet talk to each other using words selected by a human player to verbalize the conflicts between the characters.

Prior-art talking video games are disclosed in my U.S. Pat. Nos. 4,305,131; 4,333,152; 4,445,187 and 4,569,026.

It is well known for human players to input choices using any of a variety of input devices such as push buttons, rotatable knobs, pressure sensitive membranes, proximity sensitive pads, screen overlays, light pens, light sensitive guns, joy sticks, keyboards, mouse, track balls, moving cursors or crosshairs, or scrolling through highlighted options, speech recognition, etc.

The characters in video games and computer games, especially role-playing games, are of two types: player-controlled characters (or player characters) and non-player characters. A player-controlled character is a human player's animated surrogate or proxy and does or says what the human player chooses to have him do or say. Non-player characters are not directly controlled by a human player, but can be indirectly influenced, either by responding to input from a human player or by responding to what a player-controlled character does or says.

In the prior art, each choice by the human can be immediately followed by a synthesized voice or digitized voice recording that speaks the words selected by the human player, so the human will quickly adjust to the fact that the spoken words he hears for his side of the dialog are initiated by his fingers rather than his vocal cords.

SUMMARY OF THE INVENTION

This is a video game that simulates voice dialog between a human player and animated characters on a video or television screen. Controlled by a human player or players, the characters vocalize conflicts between the characters, players and problems they encounter. Branching is of two kinds: scene branching that results from a selected action or a change from one character to another and dialog branching within each scene.

BRIEF DESCRIPTION OF THE DRAWINGS

FIG. 9 illustrates branching dialog in a talking video game sequence in which two animated characters talk to each other and to a human player about a problem that presents a conflict between a proposed action and a character questioning the rationality of the proposed action.

FIG. 12 is an apparatus block diagram illustrating flow of data and method steps to generate a cyclical game play with two animated characters.

DETAILED DESCRIPTION OF THE INVENTION

Figure 1:
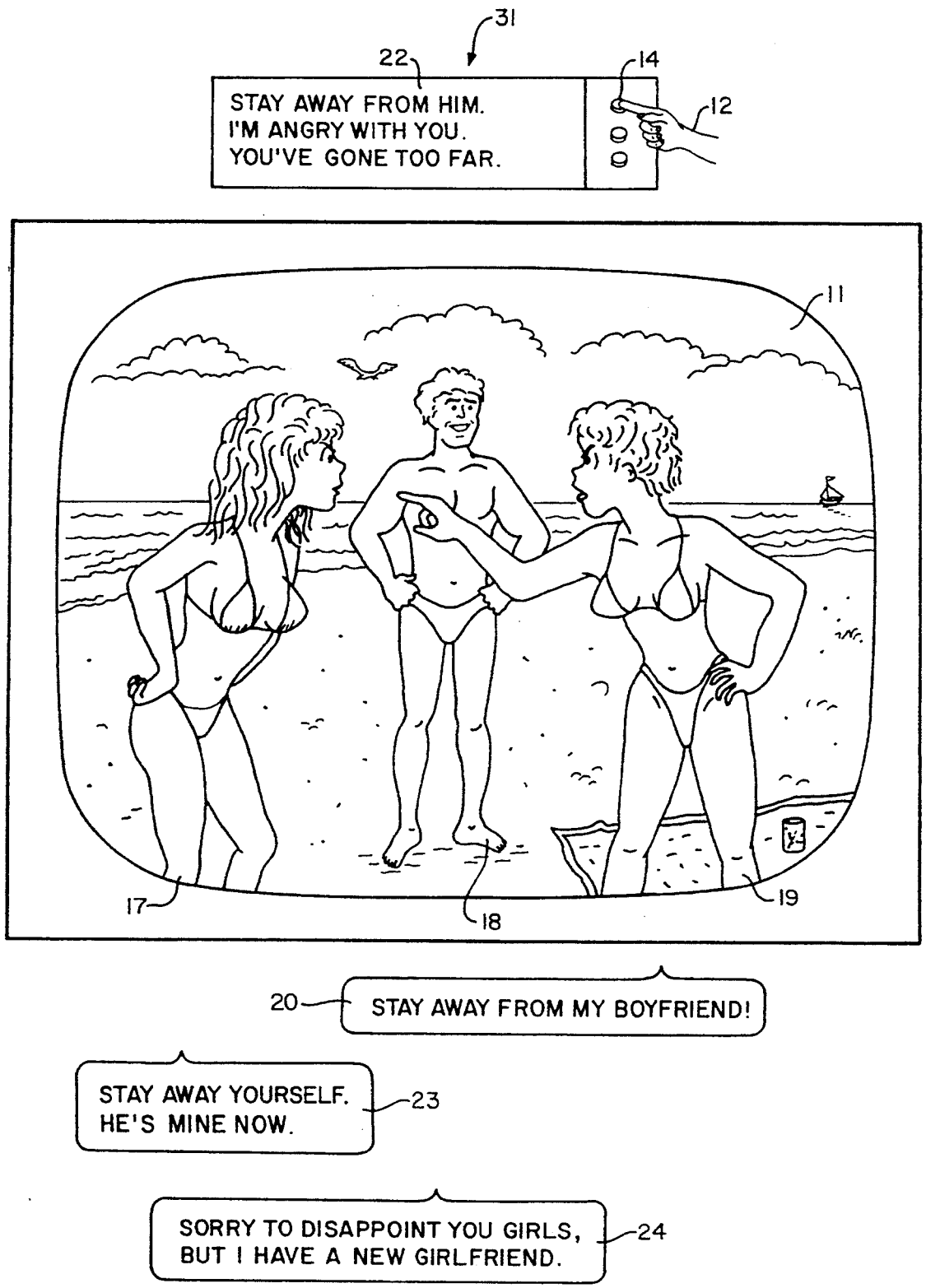
FIG. 1 illustrates a talking video game embodying the present invention with one human player and three animated characters having an argument about a conflict in their love affairs.

Referring to FIG. 1, in one embodiment of this invention a video game system generates for display on a video or television screen 11 several sequences of animated pictures of a beach scene in which three animated talking characters 17, 18, and 19 have a conflict over their love affairs and argue with each other about it. In this example character 19 is a player-controlled character who says many of the words selected by human player 12. The other characters 17 and 18 then respond with moving mouth and voice sounds to what character 19 says. The characters should have distinctive voices. The human player 12 in this example holds a hand-held controller 31 (shown more fully in FIG. 2) with three push buttons 14 positioned next to corresponding menu items on a liquid-crystal display 22. Two or more alternative response sentences or phrases are shown on display 22, each being associated with one of the three push buttons 14. The hand of human player 12 is shown pressing one of the buttons 14 that selects one of the displayed alternative sentences to be spoken by character 19.

When player 12 selects one of the displayed alternative response sentences, an animated picture is generated that shows the mouth of character 19 moving and the words selected by player 12 are sounded in the voice of character 19. These voice sounds are represented in voice balloon-20 (in this example "Stay away from my boyfriend!"). The boyfriend is character 18. Character 17 is then shown with moving mouth responding to character 19 and her response words are sounded in the voice of character 17. These voice sounds are represented in balloon 23: "Stay away yourself. He's mine now." Character 18 is then shown with moving mouth and his response is sounded as represented in balloon 24. The actions and voice sounds of characters 17, 18, and 19 are the preprogrammed actions and words for the selected sentence. If human player 12 had selected a different one of the alternative sentences, the characters would have spoken different response words and perhaps acted differently.

Before each game begins, each human player may select which character he or she wants to play. Alternatively, each player-controlled character may be shown on the video screen and the question asked "Who wants to play this character?" for each character shown. The game system then records which of the several hand-held controllers 31 responds so that later the alternative sentences for that character will be shown only on the controller for the player who is playing that character (in this example player 12 who plays the role of character 19). A human player may also choose to play a player-controlled character that is not always shown on the video screen, but who may be off-screen and carry on a dialog with on-screen characters.

Figure 2:
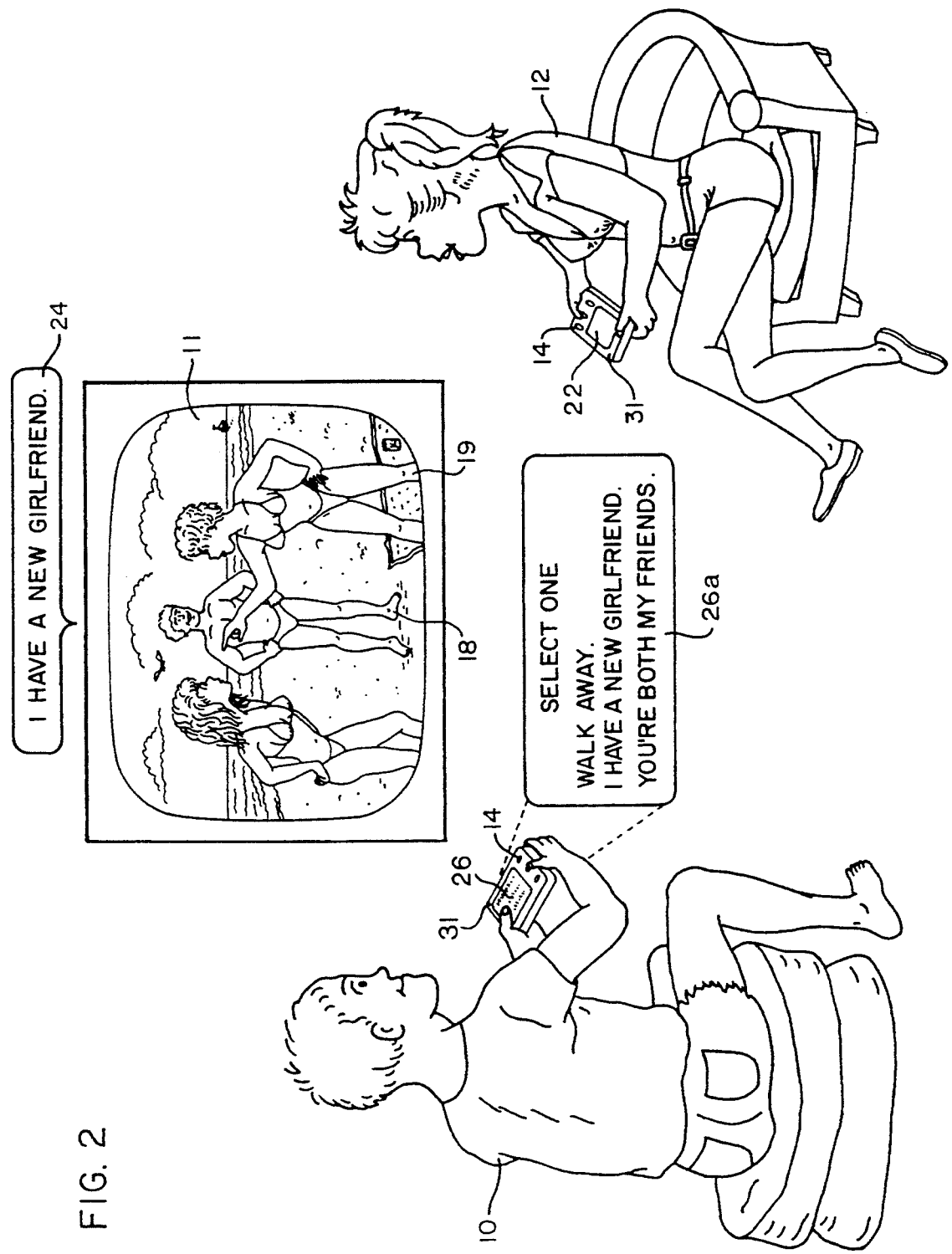
FIG. 2 illustrates a talking video game with two human players and three animated characters who are having an argument. Each human player controls one of the animated characters.

Referring to FIG. 2, in another embodiment of the invention, a video game system generates for display on video or television screen 11 an animated picture sequence having two or more animated talking characters 18 and 19, each controlled by a different one of two or more human players 10 and 12, respectively. In this example, character 18 is a player-controlled character that human player 10 controls. Player 10 plays the role of character 18 and can talk to character 19 and any other characters in the game through character 18. Likewise, character 19 is a player-controlled character that human player 12 controls. Player 12 plays the role of character 19 and can talk to character 18 and any other characters in the game through character 19. Players 10 and 12 each holds a hand-held controller 31 with three push buttons 14 next to a liquid-crystal display 22 or 26. Display 26 is shown enlarged in box 26a for clarity. The game system displays three alternative responses on display 26. Player 10 selects one of the displayed responses: (in this example "I have a new girlfriend") with the push button 14 associated with the selected displayed response. Voice sounds represented in voice balloon 24, which are the words selected from display 26, are spoken by character 18. Players 10 and 12 take turns selecting the words for their respective characters to say in a branching dialog more fully illustrated in FIG. 3.

Figure 3:
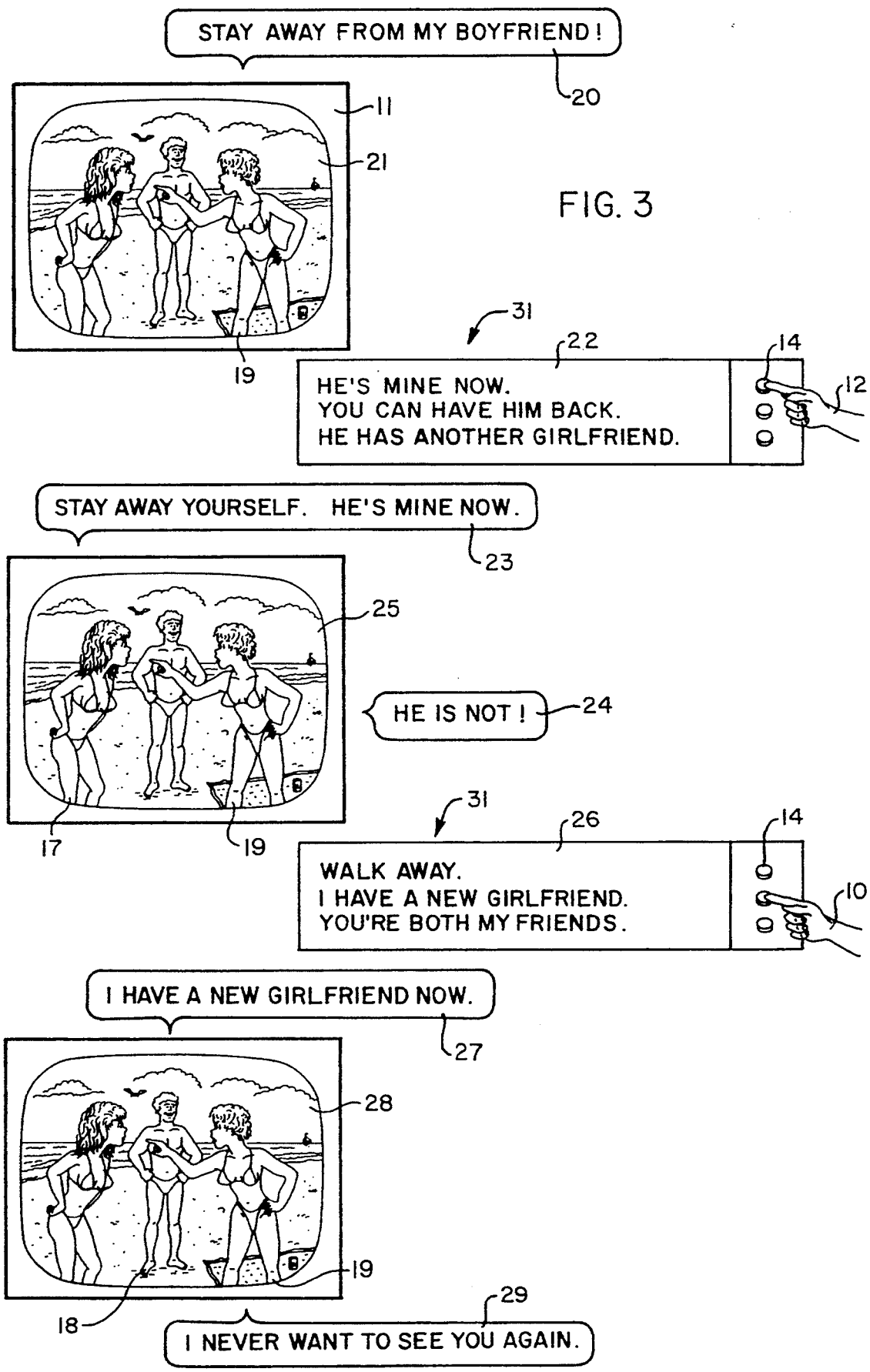
FIG. 3 illustrates branching dialog in a talking video game sequence in which an animated non-player character confronts and argues with two animated player-controlled characters.

Referring to FIG. 3, in another embodiment of the invention a video game system generates animated picture sequences 21, 25, and 28 of a beach scene in which three animated talking characters 17, 18, and 19 have a conflict over their love affairs and argue with each other about the conflict. In this example characters 17 and 18 are player-controlled characters and character 19 is a non-player character. Characters 17 and 18 say the words selected by human players 12 and 10, respectively. Character 19 responds to what characters 17 and 18 say and, in this example, begins the dialog in picture sequence 21 by pointing her finger at character 17 and says angerly "Stay away from my boyfriend!" as represented in voice balloon 20. Display 22, on controller 31 of human player 12, then shows three alternative sentences. The hand of player 12 is shown pressing one of the three buttons 14 that selects one of the alternative sentences for character 17 to say. The selected sentence, perhaps with more or fewer words as represented in voice balloon 23, is sounded in the voice of character 17 during picture sequence 25 in which the mouth of character 17 is moving: "Stay away yourself. He's mine now." Character 19 then responds automatically with the voice sounds "He is not!" as represented in voice balloon 24.

Human player 10 then gets his turn to select words for his character 18 to say. Display 26, on the controller 31 of player 10, shows three alternative sentences. The hand of human player 10 is shown pressing one of the three buttons 14 that selects one of the alternative sentences for character 18 to say. The selected sentence, as represented in voice balloon 27, is sounded in the voice of character 18 during sequence 28 in which the mouth of character 18 is moving. Character 19 then speaks again automatically and her angry words are sounded: "I never want to see you again" as represented in voice balloon 29.

Figure 4:
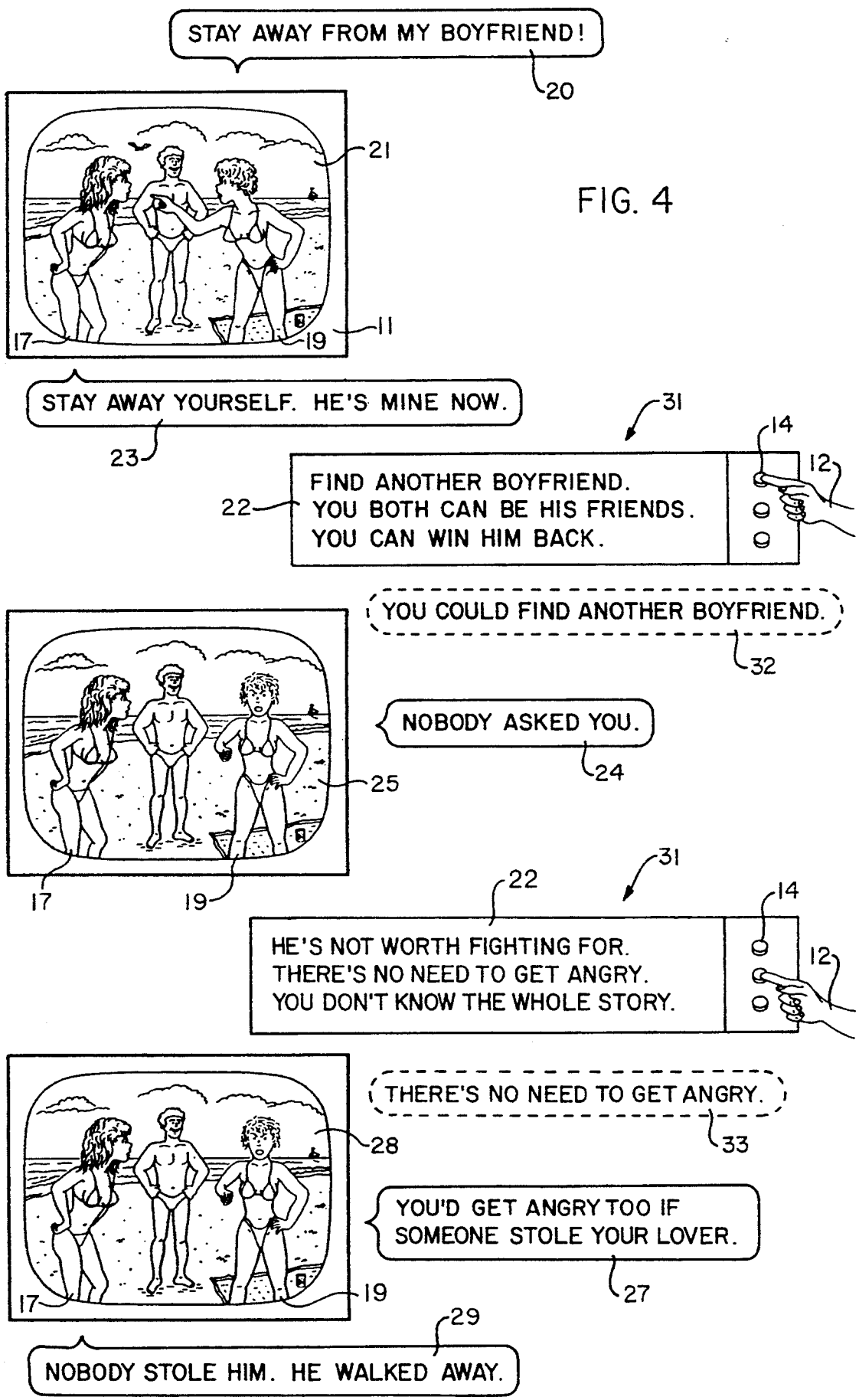
FIG. 4 illustrates branching dialog in a talking video game sequence in which two animated non-player characters argue with each other and one animated non-player character argues directly with a human player over a conflict in her love affairs. The human player takes the role of an off-screen player-controlled character.

Player-controlled character 17 need not say her words (balloon 23) immediately after human player 12 selects the words for her to say. Instead, character 19 may say her words (balloon 20) after human player 12 selects the words for character 17. For example, after human player 12 selects "He's mine now." on display 22, character 19 may say "Stay away from my boyfriend!" after which the selected words for character 17 are sounded: "Stay away yourself. He's mine now." Such changes in sequence can make the dialog seem Referring to FIG. 4, in another embodiment of the invention a video game system generates animated picture sequences 21, 25 and 28 of a beach scene in which two animated talking non-player characters 17 and 19 have a conflict over their love affairs and argue with each other about the conflict. In this example the player-controlled character (not shown) is off-screen and one or more of the non-player characters "look at" the human player, when responding to the player-controlled character. Character 19 in this example begins the dialog in picture sequence 21 by pointing her finger at character 17 and says angerly "Stay away from my boyfriend!" in voice balloon 20. Character 17 is then shown responding and automatically says the words in voice balloon 23: "Stay away yourself. He's mine now." Display 22, on controller 31 of player 12, then shows three alternative sentences. The hand of human player 12 is shown pressing one of the three buttons 14 that selects one of the alternative sentences for the off-screen player-controlled character to say. The selected sentence as represented in voice balloon 32, is sounded in the voice of the off-screen character. Character 19 then responds by turning to face the off-screen player-controlled character and angrily sounds the words in voice balloon 24: "Nobody asked you."

Controller 31 next shows three different alternative sentences on display 22. The hand of human player 12 is shown pressing one of the three buttons 14 that selects one of the second alternative sentences for the off-screen player-controlled character to say. The selected sentence in voice balloon 33 is sounded in the voice of the off-screen character: "There's no need to get angry." Character 19 then responds again in picture sequence 28 with the sounded words in voice balloon 27: "You'd get angry too if someone stole your lover." Character 17 then automatically responds to the words in balloon 27 with the words in balloon 29: "Nobody stole him. He walked away."

Figure 5:
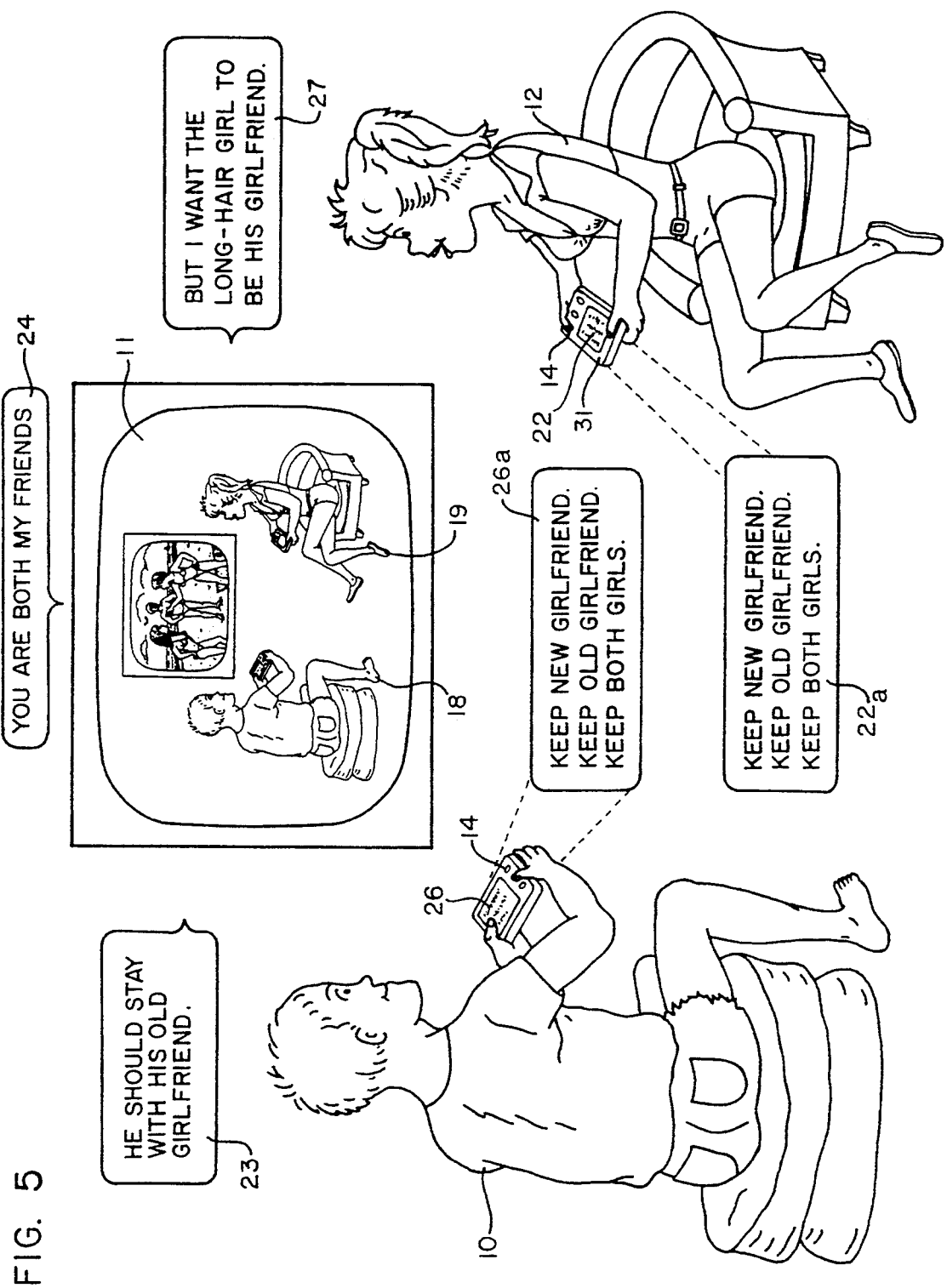
FIG. 5 illustrates a talking video game with two human players and two animated characters who have a disagreement. Each human player controls one of the animated characters.

Referring to FIG. 5, in another embodiment of the invention, a video game system generates for display on video or television screen 11 an animated picture sequence having two or more animated talking characters 18 and 19 controlled by two or more human players 10 and 12, respectively. In this example, characters 18 and 19 are player-controlled characters that are shown playing a video game within a video game. Player 10 plays the role of character 18 and can talk to character 19 and any other characters in the game through character 18. Likewise, player 12 plays the role of character 19 and can talk to character 18 and any other characters in the game through character 19. Players 10 and 12 each holds a hand-held controller 31-with three push buttons 14 next to a liquid-crystal display 22 or 26. The controller display 26 of player 10 is shown enlarged in box 26a for clarity and the controller display 22 of player 12 is shown enlarged in box 22a for clarity. The game system displays three alternative responses for each player on each of their displays 26 and 22 as shown in boxes 26a and 22a. Player 10 selects one of the displayed responses: (in this example "Keep old girlfriend") with the push button 14 associated with the selected displayed response. Likewise, player 12 selects one of the displayed responses: (in this example "Keep new girlfriend") with the push button 14 associated with her selected displayed response. The sentence selected by player 10 conflicts with the sentence selected by player 12.

This conflict results in the video characters 18 and 19 saying conflicting words such as arguing or disagreeing. Character 18 says the words in voice balloon 23 selected from display 26a or says words in accord with the words selected from display 26a. Character 19 says the words in voice balloon 27 selected from display 22a or says words in accord with the words selected from display 22a which conflict with the words of voice balloon 23 said by character 18. In response to the vocal conflict between the sentences spoken by characters 18 and 19, a character in their video game within a game says words indicated in voice balloon 24 that respond to the words spoken by character 18 shown in voice balloon 23 and to the words spoken by character 19 shown in voice balloon 27.

Figure 6:
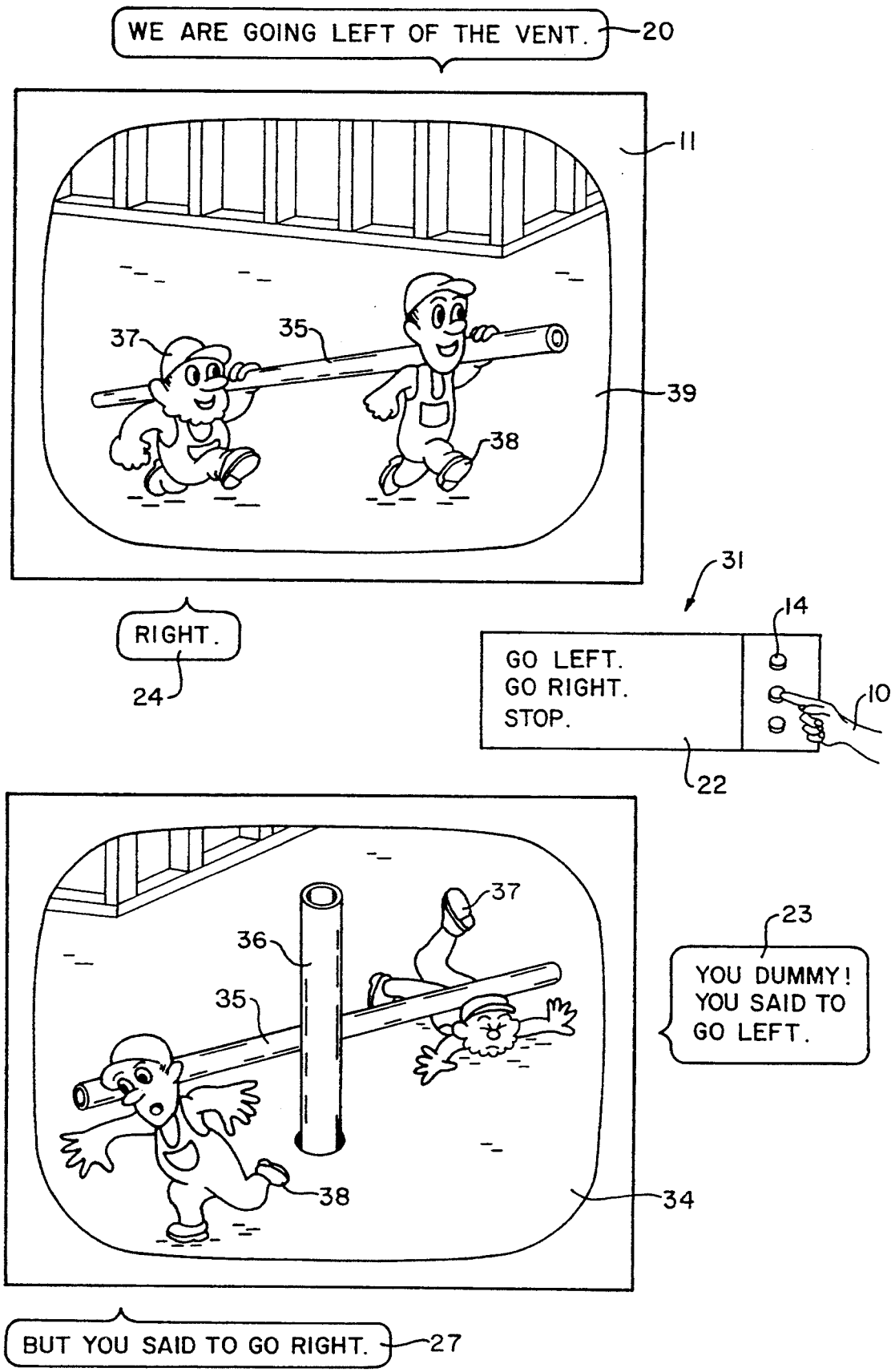
FIG. 6 illustrates a talking video game in which two animated characters argue with each other over misunderstood directions given by a human player.

Referring to FIG. 6, in another embodiment of the invention a video game system generates animated picture sequences 39 and 34 in which two animated talking characters 37 and 38 have a conflict resulting from a misunderstanding. In sequence 39, characters 37 and 38 are carrying a length of pipe 35. Character 38 tells character 37 which direction he intends to go with the sentence in voice balloon 20: "We are going left of the vent." which is sounded in the voice of character 38. Character 37 acknowledges this by saying the word indicated in balloon 24 which in English is ambiguous and could mean either "I understand" or "go right". The human player 10 in this example holds the hand-held controller 31 with three push buttons 14 positioned next to display 22 showing a menu of alternative response sentences or phrases. The hand of human player 10 is shown pressing one of the buttons 14 that selects one of the alternative sentences.

When player 10 selects a sentence, the words of the selected sentence indicate the action to be taken by character 38. Whatever action for character 38 is selected by player 10, character 37 does the opposite action, thus showing that he misunderstands character 38. Because of this misunderstanding, the two characters go in conflicting directions; in this example character 37 going left (from his point of view) and character 38 going right. This conflict of actions results in the pipe 35 colliding with a vent pipe 36 which causes both characters to lose their grip on pipe 35 and to lose balance. The pipe 35 and character 37 fall to the floor and character 37 says the words in balloon 23: "You dummy! You said to go left." Character 38 replys with the words in balloon 27: "But you said to go right." Thus, the characters vocalize the conflict, but only after the accident has happened. A conflict will occur if human player 10 selects words that cause a conflict. Such misunderstanding conflicts may also occur that are not the direct result of a player's selection.

In the Japanese language a similiar misunderstanding can result if character 38 hears only part of what character 37 says. Thus character 37 may say "migi ni onaji" as represented in voice balloon 24 which means "my actions will be same as yours". But character 38 hears only "miji" which means "right". Character 38 takes miji to mean that character 37 intends to go right, thus creating a misunderstanding.

Figure 7:
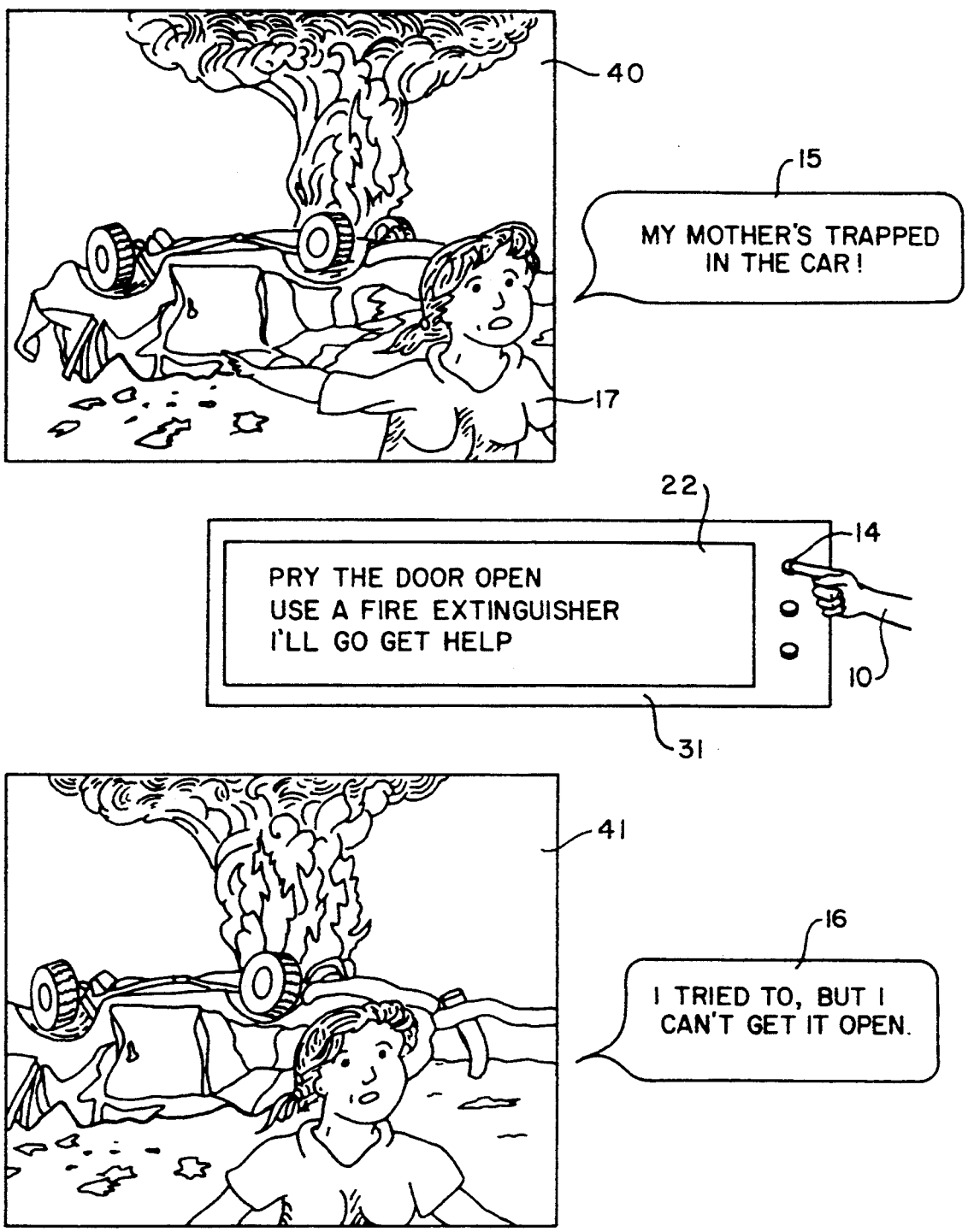
FIG. 7 illustrates a talking video game in which branching dialog occurs and selection of an action by a human player results in scene branching to FIG. 8.

Referring to FIG. 7, in another embodiment of this invention a video game system displays animated picture sequences 40 and 41 on a television or video screen. The picture sequences are a scene showing a burning car in the background and a frightened woman 17 in the foreground. During sequence 40 the woman's voice 15 says "Please help me! My mother's trapped in the car!" The game then displays two or more alternative responses on hand-held display 22 or on the video screen or other display device. Human player 10 selects one of the displayed responses (such as "Pry the door open") and presses the corresponding push button 14 or equivalent. While the player is deciding which button to press, a linking picture sequence (not shown) continues to show the same scene with the woman looking anxiously at the player. When the player selects a response, animated picture sequence 41 continues showing the same burning car scene with the woman's voice 16 answering responsively, for example: "I tried to, but I can't get it open" as at 16. The example shown in FIG. 7 illustrates branching dialog within one scene.

Selecting a response by pushing a button 14 can result in an immediate change to a different scene, but in this example the scene remains the same until after the responsive dialog in balloon 16. Each of the three alternative responses on display 22 will result in a different answer by animated character 17. Sequences 40 and 41 are generated by the video game system by overlaying three moving pictures: (1) the background sequence showing the burning car with flames continually flickering, (2) a sprite or mosaic of sprites showing the woman character 17 moving in a natural manner against the background (This motion can be the same regardless of the dialog) and (3) mouth and other facial sprites selected (by table lookup) by the game system to be approximately lip-synchronized with voice sounds 15 and 16.

Since the player's response time is variable, sequence 40 or 41 with a closed mouth sprite should cycle continually until a button 14 response is made or until a time limit is reached, at which time a prompting picture sequence with words such as "Hurry! Hurry!" may be sounded and displayed with moving mouth sprites. The burning car can be any object such as a damaged bus, airplane, boat, or building that provides a danger situation.

Figure 8:
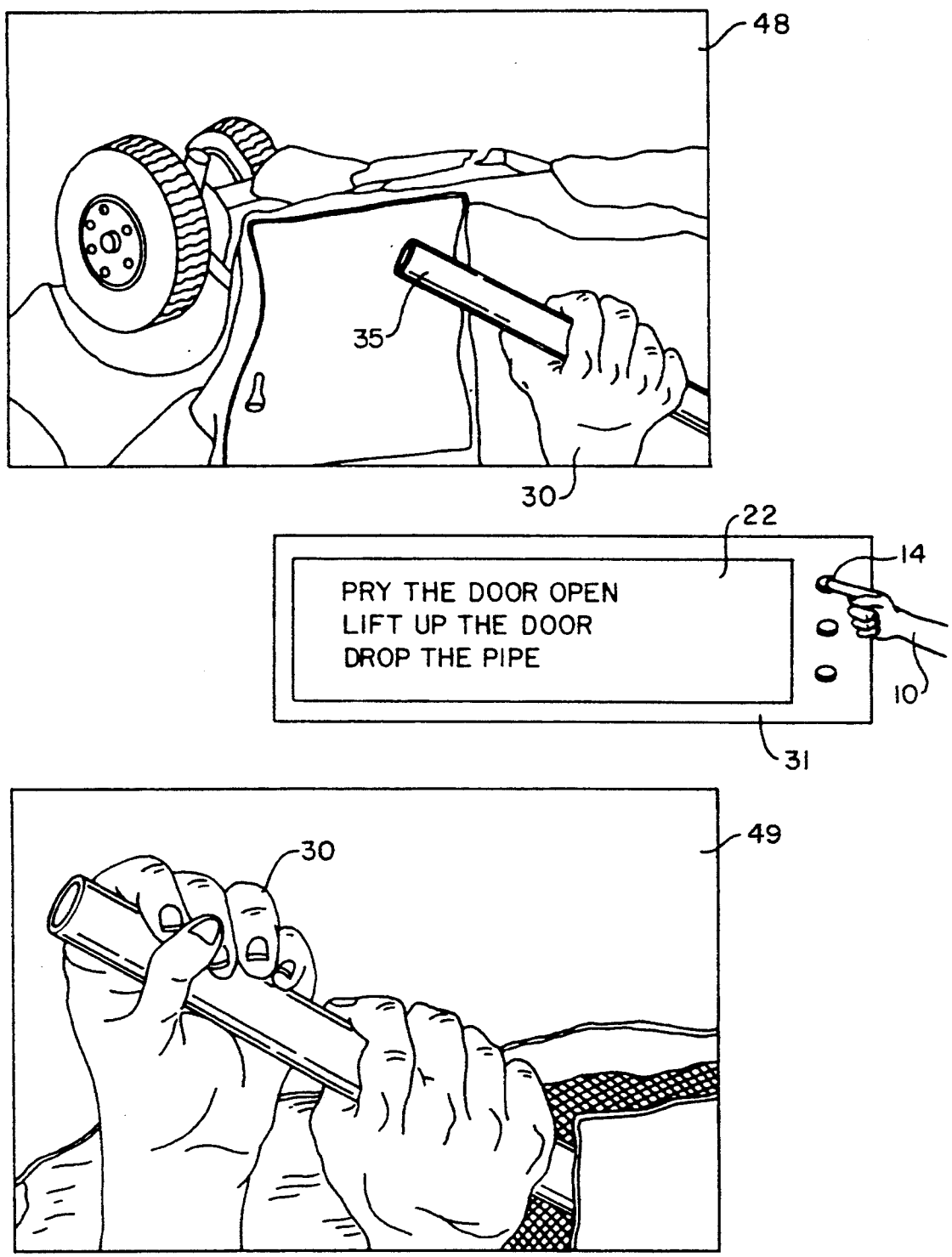
FIG. 8 is an animated sequence showing hands simulating the hands of a human player performing a selected action.

Referring to FIG. 8, the game system displays on the video screen an animated sequence showing one or more hands 36 simulating hands of a human player performing an action specified in FIG. 7. In this example, animated sequence 48 shows a hand 30 holding pipe 35 or a fire extinguisher or other such tool while the human player whose real hand 10 is illustrated pressing button 14 next to display 22 selects one of the alternative actions shown on display 22. Note that display 22 in FIG. 8 shows alternative actions that result in scene changes, but display 22 in FIG. 7 shows alternative words or phrases that an off-screen character says to animated character 17 in a common scene. In FIG. 8, pressing button 14 to select "Pry the door open" results in picture sequence 49 showing hands 30 prying open the car door with pipe 35 and also leads to the next scene such as shown in FIG. 9, thus providing two levels of branching: dialog branching as in FIG. 7 and scene branching as in FIG. 8.

Referring to FIG. 9, picture sequences 21, 25, and 28 are parts of a scene in which two talking characters discuss how to rescue another character such as the one mentioned balloon 15 in FIG. 7. One or two human players participate in the conversation by "saying" words or phrases or sentences to the animated characters who then answer responsively and ask questions or make remarks that lead to the next input by a player. The alternatives shown on display 22 are suggested solutions to the problem posed in spoken sentence 20. When the human player 10 presses button 14 next to "Call emergency", one of the characters responds in sequence 25 by asking the spoken question 23 to the other character 18 who responds with the spoken question 24 directed at a human player. Question 24 is also accompanied by alternative actions 26 being displayed on controller 31. When player 12 presses the button 14 next to "Slide down the rope", character 17 comments on this choice of action with the spoken criticism 27 in sequence 28. Thus, the problem of how to rescue an off-screen character with a rope that is too short results in a conflict between a proposed action and character 17 questioning the rationality of the proposed action.

Figure 10:
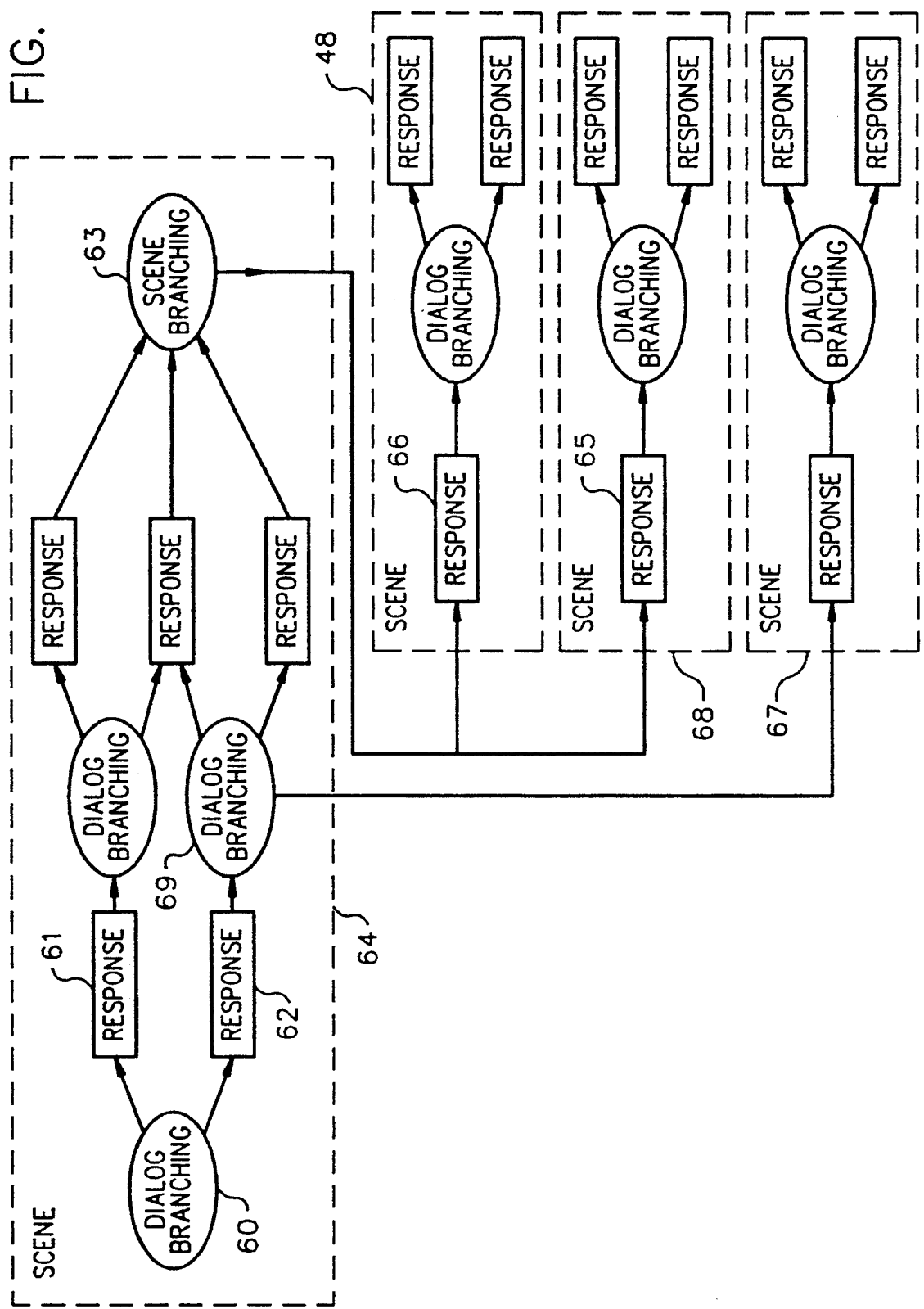
FIG. 10 is a flow diagram illustrating scene branching and dialog branching within each scene.

Referring to FIG. 10, a flowchart illustrates the distinction between branching dialog and branching scenes that are also shown in FIGS. 1-9. For example, in FIG. 10 at dialog branch point 60 in scene 64, a player is presented with two or more alternatives to choose from. Each of t-he alternative selections will result in a different vocal response 61 or 62 by one or more of the animated characters, but does not result in a scene change in this instance. However, the alternative actions at branch point 63 will result in a scene change. In this example, branch point 60 corresponds to the menu of verbal expressions displayed on hand-held controller 31 in FIG. 7. Selection from display 22 of the alternative actions will result in a scene change either to the pipe-holding sequence 48 in FIG. 8 or to another scene in which a fire extinguisher is used or a character runs for help. Branch point 69 in FIG. 10 may result in either a scene change to sequence 67 or a dialog branch depending on a player's selection. Dialog branching should occur in each scene to provide a large variety of possible dialog sequences.

If human player 10 in FIG. 7 selects the first of the three alternative actions shown on display 22, response 66 in FIG. 10 is selected which in this example includes voice sounds 16 of character 17 in FIG. 7 followed by a scene change to the pipe-holding sequence 48 in FIG. 8.

Figure 11:
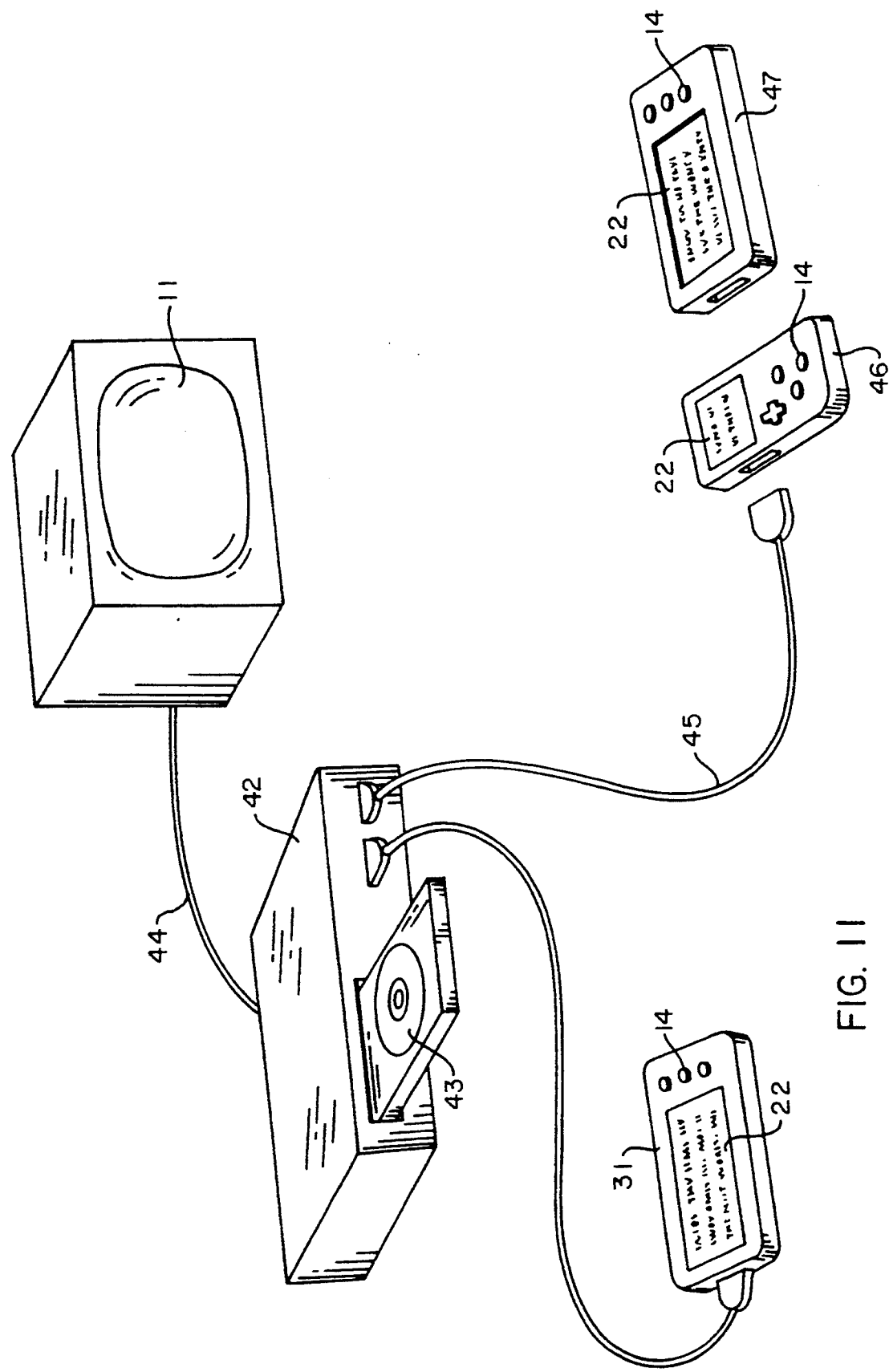
FIG. 11 is a pictorial view of a video game system having a CD-ROM disc drive connected to a television or video monitor with auxilary devices for displaying prompting words.

Referring to FIG. 11, video game system 42 is connected by cable 44 to a television or video screen 11 and to one or more hand-held control units 31 and 47 or portable game system 46, each having three push buttons 14 next to a liquid-crystal display 22 of a variable menu of verbal expressions. Infra-red or radio signals may be used instead of cables. System 42 includes a disk reader that reads digital data from a CD-ROM disk 43, or write-once disk or card or other medium containing digital data from which system 42 generates animated picture signals, compressed audio for voice and other sounds, synchronizing data, and digitized words for display on control units 31 and 47. Portable game system 46 with appropriate ROM program cartridge may substitute for control units 31 and 47. Cable 45 connects game system 42 to display unit 31, 46 or 47 and transmits alternative prompting words or other verbal expressions for display. Cable 45 also transmits push-button 14 selection signals to system 42.

Referring to FIG. 12 which is a block diagram of a special-purpose apparatus for performing some of the video game illustrated in FIG. 1, the apparatus performs steps 1 through 7 in sequence, so that the animated picture sequence on the television or video screen 11 alternates between two characters in this example. In step 1, animated picture generator 51 generates a video or RF signal for display on video screen 11 of an animated picture from digitized animated character data stored in memory 70 of a first talking character. In step 2, hand-held controller 31 displays on the liquid-crystal display 22 several alternative sentences or other verbal expressions from data read via line 72 from memory 52 storing the alternative sentences. In step 3, one of the push buttons 14 generates a selection signal (indicated by one of lines 53) selecting a sentence from among the alternative sentences in memory 52 and also selects the corresponding (indicated by dotted lines) digitized voice recordings from memory 57 and 58. In step 4, voice signal generator 54 generates a signal for output as first voice sounds from the selected digitized voice recording (via line 73) in memory 57 that expresses or responds to the words displayed on controller 31. In step 5, animated picture generator 55 generates a signal for display on video screen 11 of an animated picture from digitized animated character data stored in memory 71 of a second talking character. In step 6, voice signal generator 56 generates a signal for second voice sounds from the selected digitized voice recording (via line 74) in memory 58 that respond to the words generated by voice signal generator 54. In step 7, a new set of alternative sentences from disk or memory 59 is loaded into memory 52, 57 and 58 and the sequence of steps begins again with step 1.

The angry dialog at the beach illustrated in FIG. 1 and the game within a game illustrated in FIG. 5, and the misunderstanding illustrated in FIG. 6 are only a few of many ways for players to encounter conflicts between a character and another character, a group of characters, a danger, obstacle, disaster, laws, customs, conflict with nature, or conflict within themselves. Many other situations involving vocal conflict can be simulated in similar ways. For example, a video character may have an argument with an uncooperative dog. Or an alien monster may make demands of a hero character during a life-or-death struggle. Or two small children characters may claim the same toy (i.e. "It's mine." and "No, it's mine."). Or a good guy may have to rescue two endangered but separate characters who are both calling for help. Or an old magician may question the incantations of an inexperienced, young magician. If a human-conflict makes good drama on stage, film or television, a video game can be based on such conflict by making use of the methods illustrated herein.

To allow each background scene to be used with different animated characters who can move around against the background scene, the digital animation data for the background scene should be stored separately from the digital animation data for each character. Similarly, to allow each character to say many different sentences without a scene change, the digitized voice data should be independent of the animation data. In the preferred embodiment, animated character video, voice sound sequences and prompting word sequences are generated independently from separately stored digital data. Dialog data that is not used in one scene may be used later in a different scene with the same or different characters. The voice data may consist of sequences of codes or compressed digital recordings of words, phrases, word segments or phonemes in several distinctive voices so that each character can speak thousands of preprogrammed words or sentences. Similarly, the digital data for each animated character's body may be stored separately from sprite data for moving lips, facial expressions, and gestures, so that each character and its distinctive voice can be lip-synchronized with different mouth movements depending on which branch the dialog takes. The digital data for each animated character may also combine body, lips, expressions, gestures and voice sounds.

When a human player presses one of the buttons 14, the game system may generate a voice sound speaking the selected sentence as a substitute for the player's side of the dialog. The animated character's voice then responds as if the generated voice sounds had been spoken by the human player. Because the player selects the words which are actually sounded, he will quickly adjust to the fact that the spoken words he hears for his side of the dialog are initiated by his fingers rather than his vocal cords. This "echo" voice repeating the selected words is important for games with multiple human players so that each player will hear what each of the other players has "said" to on-screen characters. Pushing one of the buttons 14 selects both a simulated verbal response to the words previous spoken by an animated character and also selects a new dialog sequence that corresponds to the simulated verbal response shown on display 22. The selected dialog sequence includes the face and voice of the animated character speaking words which are responsive to the player's selected verbal response.

When voice sounds expressing a selected verbal expression are generated, the generated voice sounds can be different than the selected displayed verbal expression on which the generated voice sounds are based. For example, a player may select the displayed expression "good-bye" but the voice sounds of the player-controlled character may be expanded into a longer phrase such as "I'm really sorry to leave you now" or the displayed words may be translated into a-different language when voiced.

The illustrated embodiments of the invention make use of the hand-held controller 31 having one push-button 14 for each menu item on display 22 to avoid subtitles on the video or television screen. Alternatively, the menus may be shown on a video or television screen instead of on the hand-held display and be selected by players using hand-held controllers 31 that lack displays.

Alternatively, the menus of alternative verbal expressions may be presented to each player as generated voice sounds on earphones worn by each player. Only the player who is selecting a verbal expression will hear the alternative verbal expressions. The other players will hear only the selected verbal expression in their earphones. Thus the word "displaying" as used in this application can mean showing on a hand-held controller or showing on a video or television screen or presenting as voice sounds by the video game system to a human player.

Each character can be an animated cartoon, digitized live action, analog live action, a sprite, a mosaic of sprites or the like, and be player controlled or not player controlled. The term "verbal expression" means any word, words, phrase, sentence, question, expletive, curse, keyword, combination of keywords, symbol, icon, or any meaningful human voice sound such as "huh?" or "hmmm" or laughter or scream.

When writing the present patent application I included some material from the parent applications and omitted some of the material. This was done to reduce the size of the application and should not be interpreted as a disclaimer of the omitted material.

The word "conflict" is used broadly herein to encompass conflicting actions, understandings, intentions and voice conflicts that range between calm friendly discussions to angry shouting matches between two or more video characters and/or between video characters and human game players. Such conflicts may include disagreements, irritating remarks, criticisms, inconsistencies, misunderstandings, denials, insults,.contradicting, disobedience, rejection, dissent, disputes, bickering, quarrels, objecting, protests, discord, opposing, refusal to respond, lack of cooperation, breach of an agreement, differences in beliefs, opinions, goals, wishes, or needs, failure to support what another character says, and other vocal conflicts.

Although I have described the preferred embodiments of my invention with a degree of particularity, it is understood that the present disclosure has been made only by way of example and that equivalent steps and components may be substituted and design details changed without departing from the spirit and scope of my invention.

I claim:

1. A method of electronically simulating voice conversations between at least two talking animated characters, the words of one character being selected by a human player, comprising the steps of:

(a) digitally storing a catalog of distinctive voices for at least two talking characters, each in the form of voice sound data representing a plurality of sentences, phrases, word segments or phonemes;

(b) digitally storing a preprogrammed branching dialog between a first animated character and a second animated character, each branch comprising a plurality of alternative verbal expressions;

(c) generating a video signal representing an image of said first and second characters for display on a video screen;

(d) displaying on a hand-held controller apparatus a first set of alternatively selectable verbal expressions, each corresponding to a branch in said dialog;

(e) receiving from said hand-held controller a manually initiated signal representing a selected verbal expression in said first set of verbal expressions, thereby selecting a branch in the dialog;

(f) digitally reading from said catalog of voices first voice sound data that corresponds to said selected verbal expression for the voice of said first character;

(g) generating an audio signal from said first voice sound data representing the voice of said first character speaking said selected verbal expression;

(h) digitally reading from said catalog of voices second voice sound data for the voice of said second character speaking the verbal expression that follows next in the selected branch of the dialog;

(i) generating an audio signal from said second voice sound data representing the voice of said second character;

(j) displaying on said hand-held controller apparatus a second set of alternatively selectable verbal expressions that follows next for said first character in the selected branch of the dialog;

(k) receiving from said hand-held controller a manually initiated signal representing a second selected verbal expression in said second set of verbal expressions, thereby selecting a next branch in the dialog;

(l) digitally reading from said catalog of voices third voice sound data that corresponds to said second selected verbal expression for the voice of said first character expressing words that conflict with the words of said second voice sound data; and (m) generating an audio signal from said third voice sound data representing the voice of said first character speaking said second selected verbal expression.

2. The method of claim 1, wherein said second voice sound data expresses words that conflict with said first voice sound data.

3. The method of claim 1, wherein said hand-held controller is a portable game system with program cartridge.

4. A method of electronically simulating voice conversations between at least two talking animated characters, the words of one character being selected by a human player, comprising the steps of:

(a) digitally storing a catalog of distinctive voices for at least two talking characters, each in the form of voice sound data representing a plurality of sentences, phrases, word segments or phonemes;

(b) digitally storing a preprogrammed branching dialog between a first animated character and a second animated character, each branch comprising a plurality of alternative verbal expressions;

(c) generating a video signal representing an image of said first and second characters for display on a video screen;

(d) displaying on a hand-held controller apparatus a first set of alternatively selectable verbal expressions, each corresponding to a branch in said dialog;

(e) receiving from said hand-held controller a manually initiated signal representing a selected verbal expression in said first set of verbal expressions, thereby selecting a branch in the dialog;

(f) digitally reading from said catalog of voices first voice sound data that corresponds to said selected verbal expression for the voice of said first character;

(g) generating an audio signal from said first voice sound data representing the voice of said first character speaking said selected verbal expression;

(h) changing said video signal to indicate that the first character is speaking to the second character;

(i) digitally reading from said catalog of voices second voice sound data for the voice of said second character speaking the verbal expression that follows next in the selected branch of the dialog;

(j) generating an audio signal from said second voice sound data representing the voice of said second character;

(k) changing said video signal to indicate that the second character is speaking to the first character;

(l) displaying on said hand-held controller apparatus a second set of alternatively selectable verbal expressions that follows next for said first character in the selected branch of the dialog;

(m) receiving from said hand-held controller a manually initiated signal representing a second selected verbal expression in said second set of verbal expressions, thereby selecting a next branch in the dialog;

(n) digitally reading from said catalog of voices third voice sound data that corresponds to said second selected verbal expression for the voice of said first character expressing words that conflict with the words of said second voice sound data; and (o) generating an audio signal from said third voice sound data representing the voice of said first character speaking said second selected verbal expression.

5. The method of claim 4, wherein said second voice sound data expresses words that conflict with said first voice sound data.

6. The method of claim 4, wherein said hand-held controller is a portable game system with program cartridge.

7. A method of electronically simulating voice conversations between at least two talking animated characters, the words of the characters being selected by two corresponding human players, comprising the steps of:

(a) digitally storing a catalog of distinctive voices for at least two talking characters, each in the form of voice sound data representing a plurality of sentences, phrases, word segments or phonemes;

(b) digitally storing a preprogrammed branching dialog between a first animated character and a second animated character, each branch comprising a plurality of alternative verbal expressions;

(c) generating a video signal representing an image of said first and second characters for display on a video screen;

(d) displaying on a first hand-held controller apparatus a first set of alternatively selectable verbal expressions, each corresponding to a branch in said dialog;

(e) receiving from said first hand-held controller a manually initiated signal representing a first selected verbal expression in said first set of verbal expressions, thereby selecting a branch in the dialog;

(f) digitally reading from said catalog of voices first voice sound data that corresponds to said selected verbal expression for the voice of said first character;

(g) generating an audio signal from said first voice sound data representing the voice of said first character speaking said first selected verbal expression;

(h) displaying on a second hand-held controller apparatus a second set of alternatively selectable verbal expressions that follows next for said second character in the selected branch of the dialog;

(i) receiving from said second hand-held controller a manually initiated signal representing a second selected verbal expression in said second set of verbal expressions, thereby selecting a second branch in the dialog;

(j) digitally reading from said catalog of voices second voice sound data that corresponds to said second selected verbal expression for the voice of said second character;

(k) generating an audio signal from said second voice sound data representing the voice of said second character speaking said second selected verbal expression;

(l) displaying on said first hand-held controller apparatus a third set of alternatively selectable verbal expressions that follows next for said first character in the second branch of the dialog;

(m) receiving from said first hand-held controller a manually initiated signal representing a third selected verbal expression in said third set of verbal expressions, thereby selecting a third branch in the dialog;

(n) digitally reading from said catalog of voices third voice sound data that corresponds to said third selected verbal expression for the voice of said first character expressing words that conflict with the words of said second voice sound data; and (o) generating an audio signal from said third voice sound data representing the voice of said third character speaking said third selected verbal expression.

* * * * *